(12) United States Patent
Okamoto et al.

(10) Patent No.: US 7,287,149 B2
(45) Date of Patent: Oct. 23, 2007

(54) INSERTING DECODER RECONFIGURATION INSTRUCTION FOR ROUTINE WITH LIMITED NUMBER OF INSTRUCTION TYPES RECODED FOR REDUCED BIT CHANGES

(75) Inventors: Minoru Okamoto, Suita (JP); Katsuhiko Ueda, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 74 days.

(21) Appl. No.: 11/304,818

(22) Filed: Dec. 16, 2005

(65) Prior Publication Data

US 2006/0095727 A1    May 4, 2006

Related U.S. Application Data

(62) Division of application No. 10/485,547, filed as application No. PCT/JP02/07881 on Aug. 1, 2002, now Pat. No. 7,058,792.

(30) Foreign Application Priority Data

Aug. 2, 2001    (JP) .............................. 2001-235378

(51) Int. Cl.
G06F 9/30 (2006.01)
G06F 1/32 (2006.01)

(52) U.S. Cl. ...................................... 712/208; 713/320

(58) Field of Classification Search ...................... None
See application file for complete search history.

(56) References Cited

U.S. PATENT DOCUMENTS 5,790,874 A * 8/1998 Takano et al. ............... 713/320
6,157,997 A   12/2000 Oowaki et al. ............. 712/226
6,195,756 B1 * 2/2001 Hurd ........................... 713/340
6,725,450 B1 * 4/2004 Takayama .................... 717/139

FOREIGN PATENT DOCUMENTS

JP         63-111533 A      5/1988

(Continued)

OTHER PUBLICATIONS

"Full 24-bit Digital Signal Processor", MN 1920 Series LSI Manual, Matsushita Electronics Corporation 3 pages, unknown date.

*Primary Examiner*—Kenneth S. Kim
(74) *Attorney, Agent, or Firm*—McDermott Will & Emery LLP

(57) ABSTRACT

An information processing method for coding a program to enable an information processing device having an instruction decoder having a reconfigurable circuit, comprises the steps of: simulating execution of the program to obtain a history of instructions executed; extracting a routine in which a number of types of codes used in at least a field among fields constituting an instruction is limited to a predetermined number or less, from the program based on the history; inserting an instruction for changing circuit configuration of the reconfigurable circuit at start and end of the routine; allocating codes so that number of times of change of bit values in a field in which the number of types of codes used are limited is reduced for the routine; and converting a program obtained in the step of inserting an instruction to codes according to the allocation for the routine.

3 Claims, 13 Drawing Sheets

FOREIGN PATENT DOCUMENTS

| | | |
|---|---|---|
| JP | 06-149563 | 5/1994 |
| JP | 07-306782 A | 11/1995 |
| JP | 08-101773 A | 4/1996 |
| JP | 09-330219 A | 12/1997 |
| JP | 10-254696 A | 9/1998 |
| JP | 2001-125785 A | 5/2001 |

* cited by examiner

FIG. 3

| INSTRUCTION CODE | INSTRUCTION NAME | OPERATION | OPERATION CLASSIFICATION |
|---|---|---|---|
| 000 | AND | LOGICAL AND | LOGICAL OPERATION |
| 001 | OR | LOGICAL OR | LOGICAL OPERATION |
| 010 | XOR | EXCLUSIVE OR | LOGICAL OPERATION |
| 011 | MOV | TRANSFER | DATA TRANSFER |
| 100 | ADD | ADDITION | ARITHMETIC OPERATION |
| 101 | SUB | SUBTRACTION | ARITHMETIC OPERATION |
| 110 | MUL | MULTIPLICATION | ARITHMETIC OPERATION |
| 111 | MAC | MULTIPLY-ACCUMULATION | ARITHMETIC OPERATION |

FIG. 4

| INSTRUCTION CODE | INSTRUCTION NAME | OPERATION |
|---|---|---|
| 000 | --- | |
| 001 | --- | |
| 010 | --- | |
| 011 | --- | |
| 100 | MAC | MULTIPLY-ACCUMULATION |
| 101 | ADD | ADDITION |
| 110 | --- | |
| 111 | MOV | TRANSFER |

FIG. 9

| INSTRUCTION CODE | INSTRUCTION NAME | OPERATION | REMARKS |
|---|---|---|---|
| 000 | AND | LOGICAL AND | |
| 001 | OR | LOGICAL OR | |
| 010 | XOR | EXCLUSIVE OR | |
| 011 | MOV | TRANSFER | |
| 100 | ADD | ADDITION | |
| 101 | SUB | SUBTRACTION | |
| 110 | RCNFG | RECONFIGURATION | CHANGE THE CONFIGURATION OF INSTRUCTION DECODER 23 |
| 111 | MAC | MULTIPLY-ACCUMULATION | |

FIG. 12

| INSTRUCTION CODE | INSTRUCTION NAME | OPERATION |
|---|---|---|
| 00 | MAC | MULTIPLY-ACCUMULATION |
| 01 | ADD | ADDITION |
| 10 | — — — | |
| 11 | MOV | TRANSFER |

INSERTING DECODER RECONFIGURATION INSTRUCTION FOR ROUTINE WITH LIMITED NUMBER OF INSTRUCTION TYPES RECODED FOR REDUCED BIT CHANGES

RELATED APPLICATION

This application is a divisional of Application Ser. No. 10/485,547 filed Feb. 2, 2004, now issued U.S. Pat. No. 7,058,792, which is the U.S. National Phase under 35 U.S.C. § 371 of International Application No. PCT/JP02/07881 filed Aug. 1, 2001, and which claims priority to Japanese Application No. 2001-235378 filed on Aug. 2, 2001.

TECHNICAL FIELD

The present invention relates to an information processing device having a reconfigurable circuit that can change the circuit configuration.

BACKGROUND ART

In recent years, with the expansion of the digital signal processing field, a digital signal processor (hereinafter, referred to as a DSP) has found broad application in equipment such as mobile communication equipment. Such equipment is driven with a battery. Therefore, reduction of the power consumption of the DSP is strongly desired. In a DSP, in general, instructions are read from a built-in memory or a memory externally connected to the DSP, which stores a program in advance, and an instruction decoder decodes the instructions and outputs various control signals to a processing unit such as an arithmetic logic unit (ALU).

FIG. 13 is a block diagram showing a configuration of a portion of a conventional DSP related to decoding of instructions. When instructions are to be read from a built-in memory 92 and executed, a program counter 91 outputs addresses to the memory 92, and the memory 92 outputs instructions stored at the input addresses to an instruction decoder 93. The instruction decoder 93 decodes the input instructions, produces various control signals as decoded results DC and outputs the signals to a processing unit 94. The processing unit 94 executes operations such as addition and subtraction, for example, according to the decoded results DC.

When instructions are to be read from an externally connected memory 97, the program counter 91 outputs addresses to the memory 97 via a pad 95, and the memory 97 outputs instructions stored at the input addresses to the instruction decoder 93 via a pad 96. The instruction decoder 93 decodes the input instructions and outputs the decoded results DC to the processing unit 94, as in the case of reading instructions from the memory 92.

FIG. 2 is a view illustrating an example of the structure of an instruction input into the instruction decoder 93. The highest-order field is used to specify the type of operation or data transfer, and the subsequent field is used to specify the type of register into which data is written. The next two fields are used to specify the type of register from which data is read (see "MN1920 Series LSI Manual", Matsushita Electronics Corporation, p. 2-2, 1990, for example).

Problem to be Solved

In execution of a program with the DSP having the above configuration, different instructions are sequentially input into the instruction decoder 93. Every time such instructions are input, the potential of the lines and the pad 96 on the route from the memory 92 or 97 to the instruction decoder 93 changes from a low potential "L" to a high potential "H", or from "H" to "L". In general, in an LSI of a CMOS (complementary metal oxide semiconductor) structure, the operating current is highest when the potential of a signal changes. Accordingly, the power consumption in decoding of an instruction is greater as a larger number of bits of an instruction input into the instruction decoder 93 changes in value.

In an information processing device such as a DSP that is incorporated in an apparatus, a program will not be changed normally once details of processing are determined and the device is incorporated in an apparatus. The DSP performs processing steps sequentially according to the program. In many cases, the types of instructions executed in a given processing step are limited. Even in such cases, however, the DSP is prepared to be adaptive to execution of all instructions, and there has been made no attempt of changing the width of the instruction field and the allocation of instruction codes.

DISCLOSURE OF THE INVENTION

The object of the present invention is to reduce the power consumed when an information processing device such as a DSP decodes instructions.

The first information processing device of the present invention is an information processing device for reading and executing a program stored in memory means, including: a program counter for outputting an address for reading the program to the memory means; a first instruction decoder for decoding instructions read from the memory means in response to a control signal indicating a period in which the types of codes used in at least a field among fields constituting an instruction in the program are limited to a predetermined number or less; and controlled means for performing processing corresponding to decoded results output from the first instruction decoder, wherein the first instruction decoder has a reconfigurable circuit that changes the circuit configuration in response to the control signal so that the decoding is performed based on a relationship between codes in a field in which the types of codes used are limited and decoded results, the relationship being set so that the number of times of change of bit values in the field is reduced.

According to the invention described above, during a period in which the types of codes used in a field constituting an instruction are limited to a predetermined number or less, the number of times of change of bit values in the field decreases. Therefore, the power consumption of the information processing device can be reduced.

In the first information processing device described above, preferably, the relationship between codes and decoded results is set based on the order of execution of the instructions.

According to the invention described above, the number of times of change of bits of codes included in instructions decreases. Therefore, the power consumption of the information processing device can be reduced.

Preferably, the first information processing device described above further includes a timer for holding the start time and end time of the period, counting the time from start of execution of the program, and outputting a signal indicating that the counted value is a value corresponding to the start time and the end time as the control signal.

Preferably, the first information processing device described above further includes comparison means for holding values of the program counter at the start time and end time of the period and outputting a signal indicating that the output of the program counter corresponds to the start time and end time of the period as the control signal.

Preferably, the first information processing device described above further includes a second instruction decoder for decoding an instruction in the program and outputting a signal indicating whether or not the instruction is an instruction for changing the circuit configuration of the first instruction decoder as the control signal.

Preferably, the first information processing device described above further includes: a second instruction decoder for outputting a value based on an instruction in the program; and a register for storing the output of the second instruction decoder and outputting the stored value as the control signal.

In the first information processing device described above, preferably, the relationship between codes and decoded results used after the change of the circuit configuration is set so that the bit length of the codes in the field is shortened.

According to the invention described above, the bit length of instruction codes included in instructions executed is shortened, and thus the capacity required for a memory storing a program can be reduced.

In the first information processing device described above, preferably, the memory means, the first instruction decoder and the controlled means are formed on one chip.

The first information processing method of the present invention is an information processing method for reading and executing a program stored in memory means, the method including the steps of: outputting an address for reading the program to the memory means; decoding instructions read from the memory means in response to a control signal indicating a period in which the types of codes used in at least a field among fields constituting an instruction in the program are limited to a predetermined number or less; and performing processing corresponding to decoded results obtained by decoding the instructions, wherein in the step of decoding, the circuit configuration of a reconfigurable circuit is changed in response to the control signal so that the decoding is performed based on the relationship between codes in a field in which the types of codes used are limited and decoded results, the relationship being set so that the number of times of change of bit values in the field is reduced.

Preferably, the first information processing method described above further includes the step of outputting a signal indicating that it is the start time and end time of the period, as the control signal.

Preferably, the first information processing method described above further includes the step of outputting a signal indicating that the address for reading the program corresponds to the start time and end time of the period, as the control signal.

Preferably, the first information processing method described above further includes the step of outputting a signal indicating that an instruction for changing the circuit configuration has been input, as the control signal.

In the first information processing method described above, preferably, the relationship between codes and decoded results used after the change of the circuit configuration is set so that the bit length of the codes in the field is shortened.

The second information processing method of the present invention is an information processing method for coding a program to enable an information processing device to execute the program, the information processing device being provided with an instruction decoder having a reconfigurable circuit, the method including the steps of: simulating execution of the program to obtain a history of instructions executed; extracting a routine in which the types of codes used in at least a field among fields constituting an instruction are limited to a predetermined number or less from the program based on the history; inserting an instruction for changing the circuit configuration of the reconfigurable circuit at the start and end of the routine; allocating codes so that the number of times of change of bit values in a field in which the types of codes used are limited is reduced for the routine; and converting a program obtained in the step of inserting an instruction to codes according to the allocation for the routine.

According to the invention described above, in coding of a program, an instruction for changing the circuit configuration of the reconfigurable circuit can be automatically inserted.

In the second information processing method described above, preferably, in the step of allocating codes, codes are allocated based on the order of execution of instructions in the routine.

The second information processing device of the present invention is an information processing device including memory means for storing codes obtained by the second information processing method.

Effect of the Invention

According to the present invention, it is possible to reduce the power consumed by an information processing device such as a DSP that is mainly embedded in a system.

BRIEF DESCRIPTION OF THE DRAWINGS

FIG. 3 is a view showing instruction codes of instructions decoded with the instruction decoder in FIG. 1 and examples of instruction names corresponding to the instruction codes.

FIG. 4 is a view showing instruction codes of instructions decoded with the instruction decoder in FIG. 1 and other examples of instruction names corresponding to the instruction codes.

FIG. 9 is a view showing instruction codes of instructions decoded with an instruction decoder in FIG. 8 and examples of instruction names corresponding to the instruction codes.

FIG. 12 is a view showing instruction codes of instructions used in a program for executing processing B and examples of instruction names corresponding to the instruction codes in Embodiment 3 of the present invention.

BEST MODE FOR CARRYING OUT THE INVENTION

Hereinafter, embodiments of the present invention will be described with reference to the relevant drawings.

Embodiment 1

Figure 1:
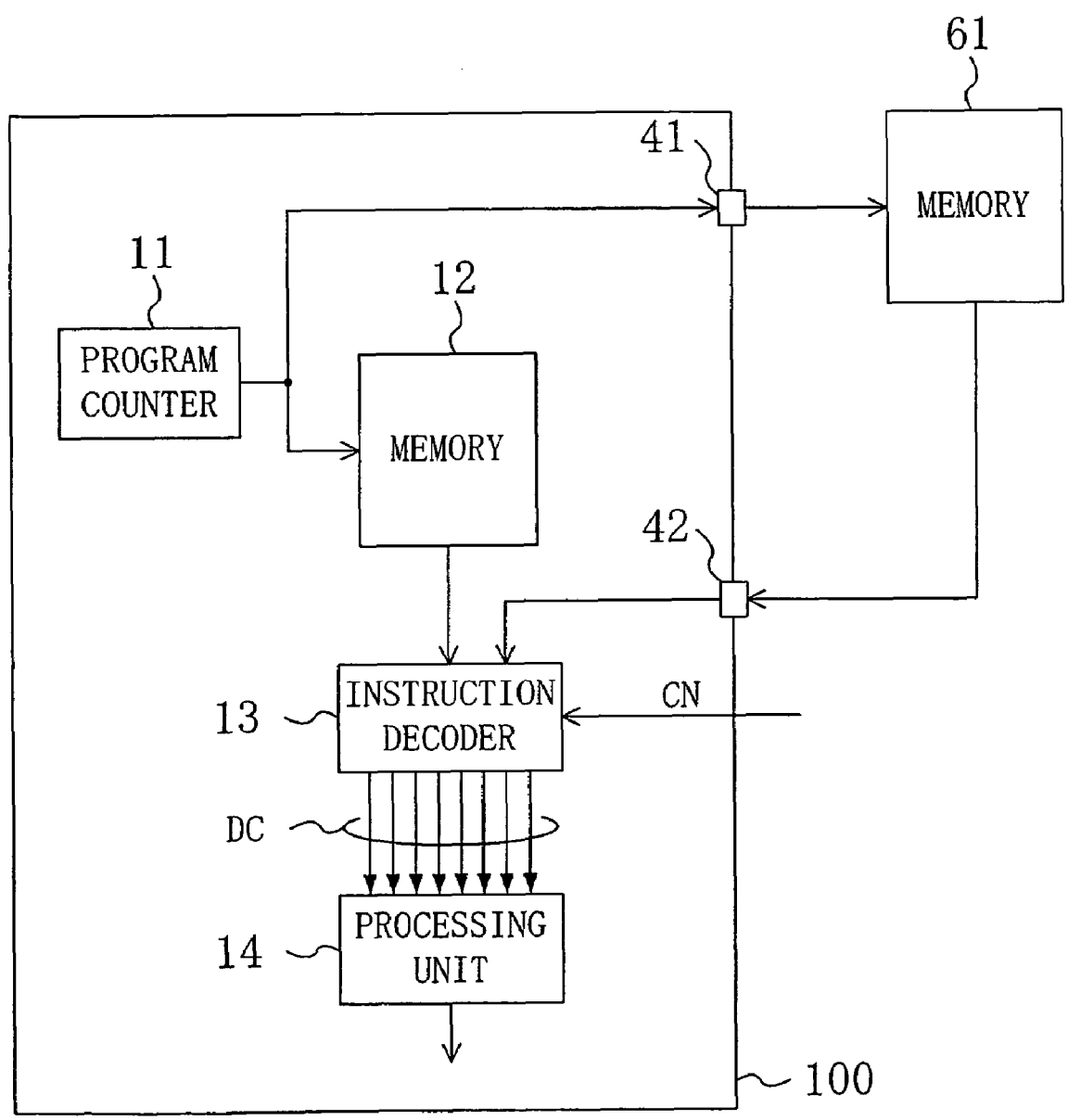
FIG. 1 is a block diagram of an information processing device of Embodiment 1 of the present invention.

FIG. 1 is a block diagram of an information processing device of Embodiment 1 of the present invention. An information processing device 100 of FIG. 1 includes a program counter 11, a memory 12, an instruction decoder 13 and a processing unit 14 as a controlled means. A memory 61 is connected to the information processing device 100 via pads 41 and 42. The information processing device 100 is specifically a processor or the like such as a DSP. The program counter 11, the memory 12, the instruction decoder 13 and the processing unit 14 are formed on one chip.

The program counter 11 produces addresses for reading instructions in a program stored in the memory 12 or 61, and outputs the produced addresses to the memory 12 or 61. When the memory 61 is used, the addresses are output via the pad 41. The memory 12 or 61 reads instructions stored therein according to the addresses sent from the program counter 11, and outputs the read instructions to the instruction decoder 13. When the memory 61 is used, the read instructions are output to the instruction decoder 13 via the pad 42. The pads 41 and 42 respectively have a buffer for driving the lines.

The instruction decoder 13 has a reconfigurable circuit that can change the circuit configuration in response to a control signal CN. The instruction decoder 13 decodes input instructions in response to the control signal CN and outputs the decoded results DC to the processing unit 14.

Figure 2:
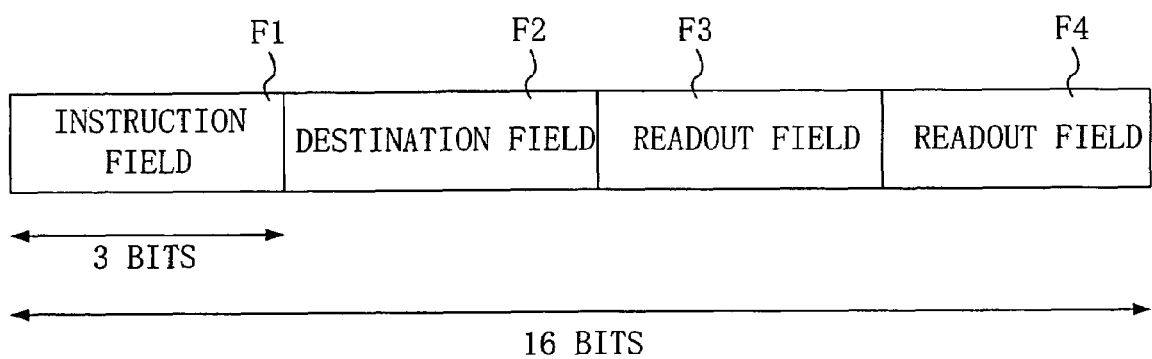
FIG. 2 is a view illustrating a structure of an instruction input into an instruction decoder in FIG. 1.

FIG. 2 is a view illustrating an example of the structure of an instruction input into the instruction decoder 13 in FIG. 1. The bit length of the entire instruction is 16 bits. The instruction shown in FIG. 2 has an instruction field F1, a destination field F2 and readout fields F3 and F4. The instruction field F1, which uses the three most significant bits, stores an instruction code for an operation instruction or a transfer instruction to be executed. The destination field F2 stores a code or the like for a register to which data is sent. The readout fields F3 and F4 store a code or the like for a register from which data is read.

FIG. 3 is a view showing instruction codes of instructions decoded with the instruction decoder 13 in FIG. 1 and examples of instruction names corresponding to the instruction codes. Specifically, FIG. 3 shows the instruction codes expressed in three bits, the instruction names corresponding to the instruction codes, the operations and the operation classifications, for eight types of operations and the like.

FIG. 4 is a view showing instruction codes of instructions decoded with the instruction decoder 13 in FIG. 1 and other examples of instruction names corresponding to the instruction codes. Specifically, FIG. 4 shows instruction codes expressed in three bits, the instruction names corresponding to the instruction codes and the operations, for three types of operations and the like. Although not shown specifically, the relationships between codes and registers and the like corresponding to the codes are also defined for the destination field F2 and the readout fields F3 and F4.

When the control signal CN is "0" (that is, "L", for example), the instruction decoder 13 decodes the instruction code in the instruction field F1 in FIG. 2 based on the correspondence shown in FIG. 3 and outputs the decoded result to the processing unit 14. When the control signal CN is "1" (that is, "H", for example), the instruction decoder 13 changes the circuit configuration of the reconfigurable circuit, decodes the instruction code in the instruction field F1 based on the correspondence shown in FIG. 4, and outputs the decoded result to the processing unit 14. As used herein, the "H" and "L" of the control signal CN represent that the signal level is logically in a high potential and a low potential, respectively.

The instruction decoder 13 also decodes codes in the destination field F2 and the two readout fields F3 and F4 in FIG. 2, and outputs the decoded results to the processing unit 14. The code in each of these fields may be decoded based on the same correspondence invariably, or, as in the instruction field, the relationship between the code in each field and the decoded result may be changed with the control signal CN.

Figure 5:
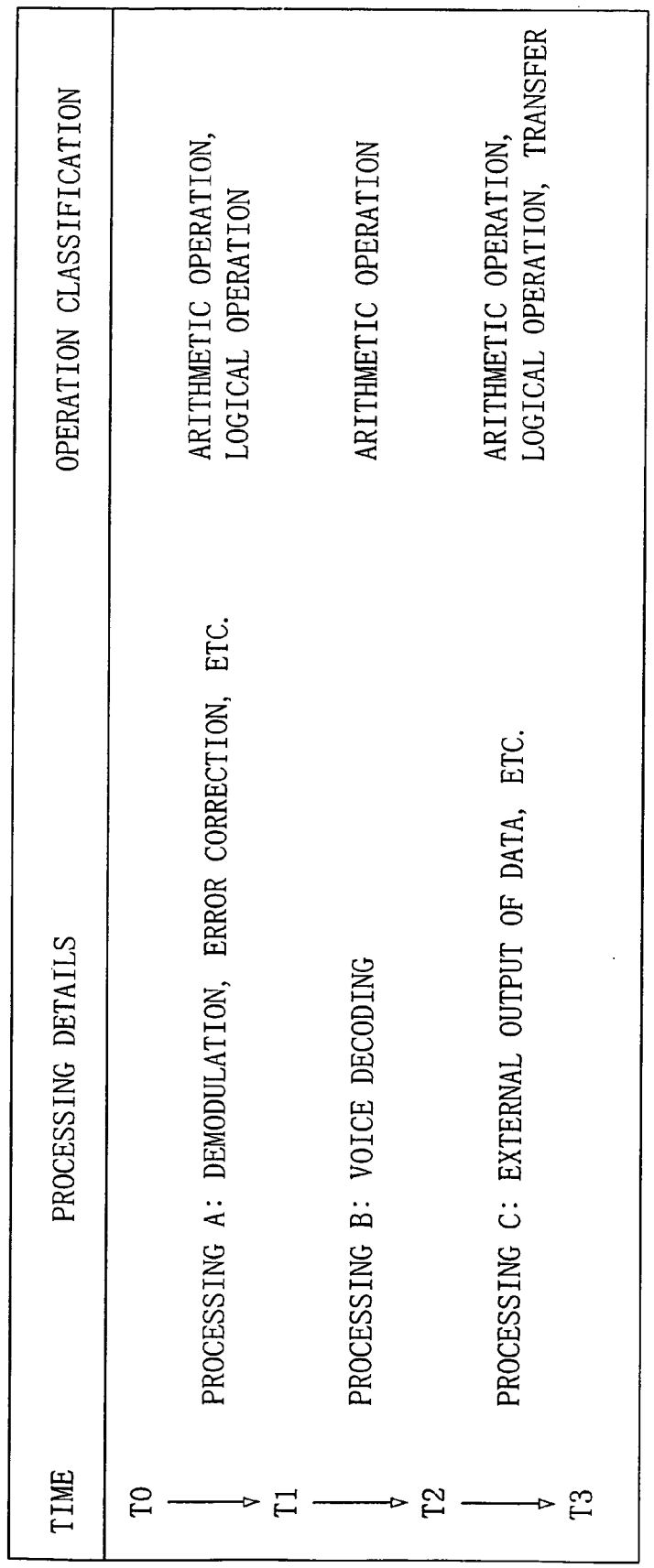
FIG. 5 is a view illustrating an example of details of processing performed by the information processing device of FIG. 1.

FIG. 5 is a view illustrating an example of details of processing performed by the information processing device 100 of FIG. 1. In this illustration, processing of received data in a mobile phone is shown as an example.

During the time from T0 to T1, the information processing device 100 receives data from an external LSI (not shown) and performs processing A, which includes processing such as demodulation and error correction. Arithmetic operation and logical operation are involved in the execution of the processing A.

During the time from T1 to T2, the information processing device 100 performs processing B based on the result of the processing A. The processing B includes voice decoding. Arithmetic operation is involved in the execution of the processing B.

During the time from T2 to T3, the information processing device 100 performs processing C based on the result of the processing B. The processing C mainly includes transfer of voice data obtained from the processing B to outside. Various other processing items are also performed. Arithmetic operation, logical operation and transfer instruction are involved in the execution of the processing C.

Before the execution of the processing shown in FIG. 5, programs for executing the processing are analyzed in advance with a simulator and the like, to record instructions to be executed and the times at which the instructions are executed. From the recorded results, it is possible to find a period in the programs during which the types of instruction codes used in the instruction field are limited to a predetermined number or less. Such a period can also be found for the codes used in the other fields. Herein, suppose it has been found that during the time from T1 to T2, that is, in the execution of the processing B, the information processing device 100 performs only three types of operations shown in FIG. 4.

Also, by recording the order of execution of instructions, it can be found that a specific instruction code tends to be executed subsequent to a given instruction code. This can also be found by recording the times of execution of the instructions. Herein, suppose it has been found that in the execution of the processing B, ADD instruction is executed subsequent to MAC instruction and MOV instruction is executed subsequent to ADD instruction with high frequency.

During the period of execution of the processing B, only the limited types of instructions are used, and the types of codes used in the instruction field F1 are limited to three. Accordingly, the relationship between the codes used in the instruction field F1 and the decoded results is set so that the number of times of change of the bit values in the instruction field F1 decreases.

To state specifically, in FIG. 4, the relationship between the instruction codes and the decoded results is set so that some bit of the instruction codes, such as the most significant bit of the instruction codes, for example, is a fixed value. By setting in this way, in the execution of the processing B, it is possible to reduce the power required for changing the potential of the bit set at a fixed value.

Also, in FIG. 4, the relationship between the codes and the decoded results is set based on the order of execution of the instructions. Specifically, based on the finding that ADD instruction is executed subsequent to MAC instruction with high frequency, it is set so that the change of the bits in the instruction field is as small as possible, that is, only one bit changes when the instruction changes from MAC instruction to ADD instruction. Likewise, it is also set so that only one bit changes in the instruction field when the instruction changes from ADD instruction to MOV instruction.

In the processing A and the processing C, which use many types of instructions, the programs for executing such processing steps are converted in advance to instruction codes based on the correspondence shown in FIG. 3 with an assembler, compiler and the like. On the contrary, the program for executing the processing B is converted in advance to instruction codes based on the correspondence shown in FIG. 4 with an assembler, compiler and the like.

Next, the operation of the information processing device 100 will be described. The control signal CN may be applied from outside the information processing device 100, or may be generated inside the information processing device 100.

During the time from T0 to T1, the information processing device 100 executes the processing A. At time T0, "0" is applied to the instruction decoder 13 as the control signal CN. The control signal CN of "0" indicates that this is not the period during which the types of codes used in the instruction field are limited. Therefore, the instruction decoder 13 decodes input instruction codes based on the correspondence shown in FIG. 3. For example, when the instruction field F1 of the input instruction is "000", the instruction decoder 13 outputs the decoded result DC that makes the processing unit 14 execute AND instruction to the processing unit 14. When the instruction field F1 of the input instruction is "101", the instruction decoder 13 outputs the decoded result DC that makes the processing unit 14 execute SUB instruction to the processing unit 14.

During the time from T1 to T2, the information processing device 100 executes the processing B. At time T1, "1" is applied to the instruction decoder 13 as the control signal CN. The control signal CN of "1" indicates the period during which the types of codes used in the instruction field are limited. Therefore, the instruction decoder 13 changes the circuit configuration of the reconfigurable circuit and decodes input instruction codes based on the correspondence shown in FIG. 4. For example, when the instruction field F1 of the input instruction is "100", the instruction decoder 13 outputs the decoded result DC that makes the processing unit 14 execute MAC instruction to the processing unit 14.

When the instruction field F1 of the input instruction is "101", the instruction decoder 13 outputs the decoded result DC that makes the processing unit 14 execute ADD instruction to the processing unit 14.

When the instruction input into the instruction decoder 13 changes from MAC instruction to ADD instruction, or changes from ADD instruction to MOV instruction, only one bit changes in the instruction field of the instruction input into the instruction decoder 13.

During the time from T2 to T3, the information processing device 100 executes the processing C. At time T2, "0" is applied to the instruction decoder 13 as the control signal CN. Therefore, the instruction decoder 13 changes the circuit configuration of the reconfigurable circuit again, decodes input instruction codes based on the correspondence shown in FIG. 3, and outputs the decoded results DC to the processing unit 14.

As described above, during the period of execution of the processing B, the instruction decoder 13 changes the circuit configuration of the reconfigurable circuit, and decodes input instruction codes based on the correspondence shown in FIG. 4. Accordingly, the number of times of change of the bit values of the instruction codes input into the instruction decoder 13 can be reduced. This leads to reduction of the number of times at which the potential of the lines and the pad 42 existing between the memory 12 or 61 and the instruction decoder 13 is changed. As a result, the power consumption of the information processing device 100 can be significantly reduced.

In particular, when the information processing device is incorporated in an apparatus, the program for the device will not be changed normally. Therefore, it is easy to determine in advance the period during which the types of instruction codes used in the instruction field are limited to a predetermined number or less.

Hereinafter, some examples of the information processing device 100 that produces the control signal CN internally will be described.

First Alteration

Figure 6:
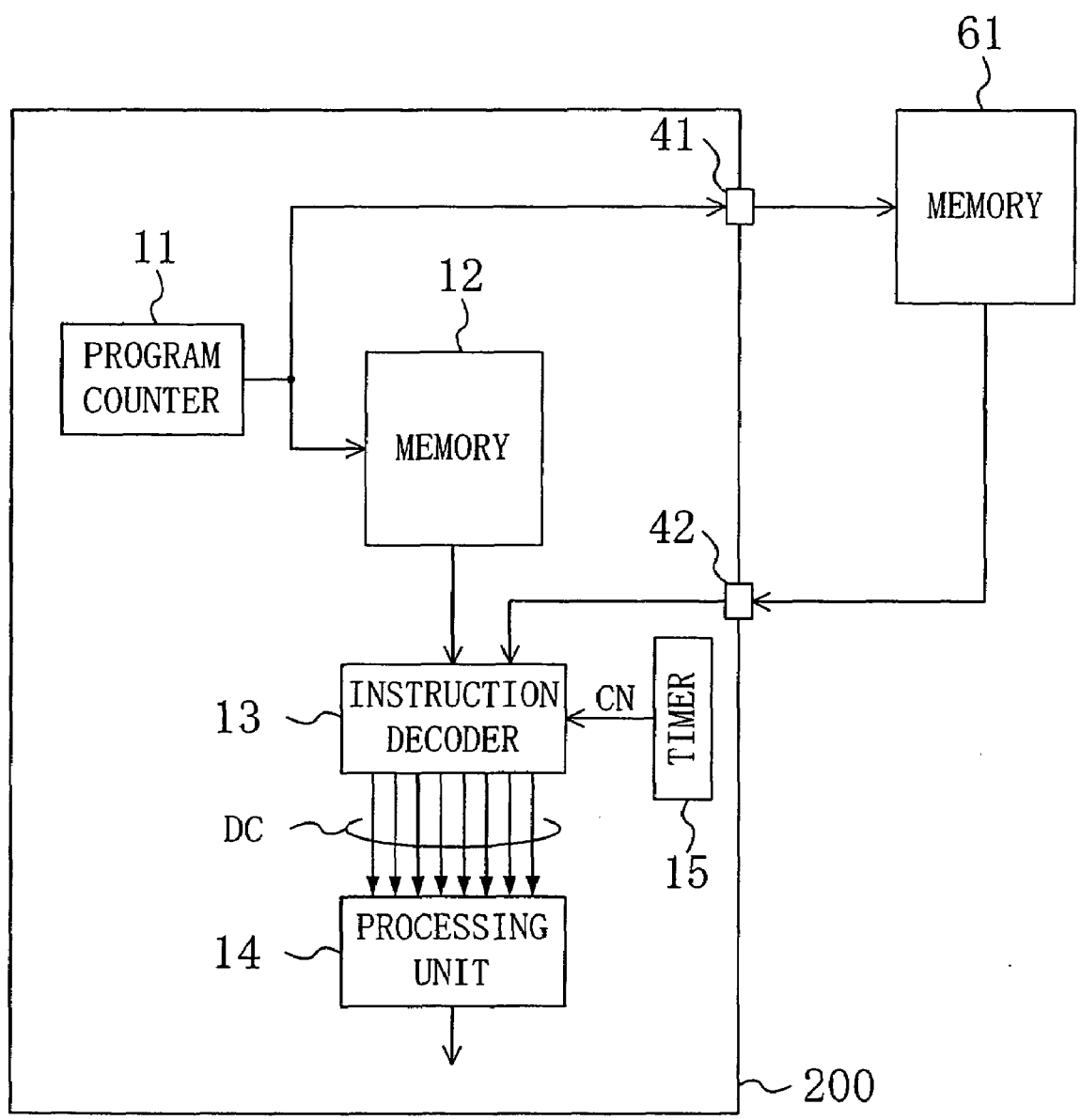
FIG. 6 is a block diagram of a first alteration to the information processing device of Embodiment 1 of the present invention.

FIG. 6 is a block diagram of an information processing device 200 of the first alteration to Embodiment 1. The information processing device 200 of FIG. 6 further includes a timer 15 in addition to the configuration of the information processing device 100 of FIG. 1, so that the output of the timer 15 is given to the instruction decoder 13 as the control signal CN.

In the timer 15, the start time T1 and end time T2 of the period during which the processing B is performed are set before the start of the processing A. For this setting, the information processing device 200 executes a program for time setting stored in advance in the memory 12.

After the setting of the times, once the processing A is started, the timer 15 sequentially increments its count value from "0" every rising edge of an operating clock (not shown) of the processor. The timer 15 outputs "1" as the control signal CN once the count value reaches a value corresponding to the time T1, and thereafter outputs "0" as the control signal CN once the count value reaches a value corresponding to the time T2.

The instruction decoder 13 decodes input instruction codes based on the correspondence shown in FIG. 3 when the control signal CN is "0", and decodes input instruction codes based on the correspondence shown in FIG. 4 when the control signal CN is "1".

As described above, in the information processing device 200 of FIG. 6, the change of bits of instruction codes can be reduced during execution of a program without the necessity of applying the control signal CN externally, and thus the power consumption can be significantly reduced.

Second Alteration

Figure 7:
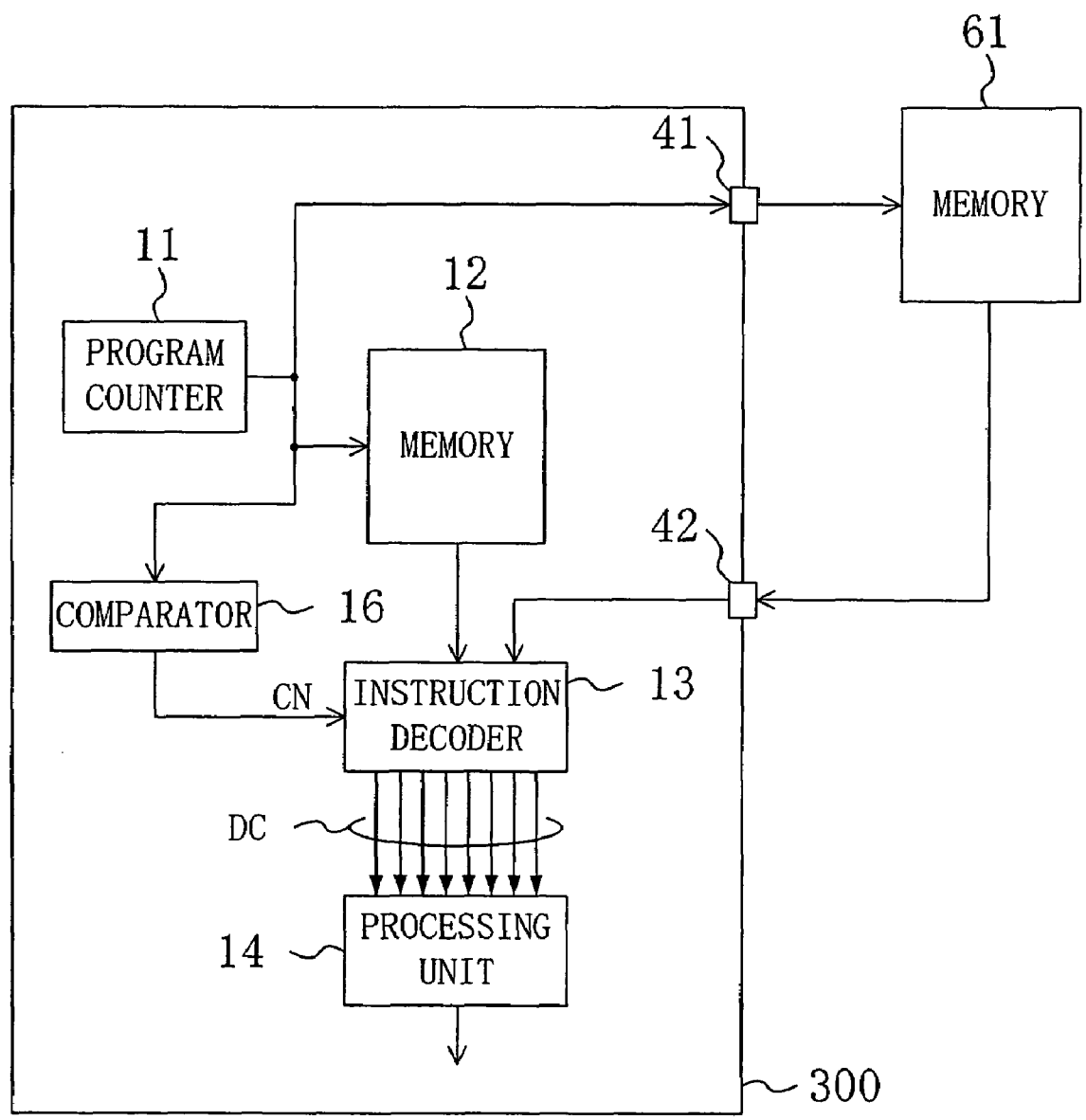
FIG. 7 is a block diagram of a second alteration to the information processing device of Embodiment 1 of the present invention.

FIG. 7 is a block diagram of an information processing device 300 of the second alteration to Embodiment 1. The information processing device 300 of FIG. 7 further includes a comparator 16 in addition to the configuration of the information processing device 100 of FIG. 1, so that the output of the comparator 16 is given to the instruction decoder 13 as the control signal CN.

In the comparator 16, the head address PC1 for the processing B and the head address PC2 for the processing C in the programs stored in the memory 12 or 61 are set before the start of the processing A. For this setting, the information processing device 300 executes a program for address setting stored in advance in the memory 12.

After the setting of the addresses, the comparator 16 compares the output of the program counter 11 with the addresses PC1 and PC2. The comparator 16 outputs "1" as the control signal CN once the output of the program counter 11 becomes equal to PC1 (start of the processing B), and thereafter outputs "0" as the control signal CN once the output of the program counter 11 becomes equal to PC2 (end of the processing B).

The instruction decoder 13 decodes input instruction codes based on the correspondence shown in FIG. 3 when the control signal CN is "0", and decodes input instruction codes based the correspondence shown in FIG. 4 when the control signal CN is "1".

As described above, in the information processing device 300, the change of bits of instruction codes can be reduced during execution of a program without the necessity of applying the control signal CN externally, and thus the power consumption can be significantly reduced.

Third Alteration

Figure 8:
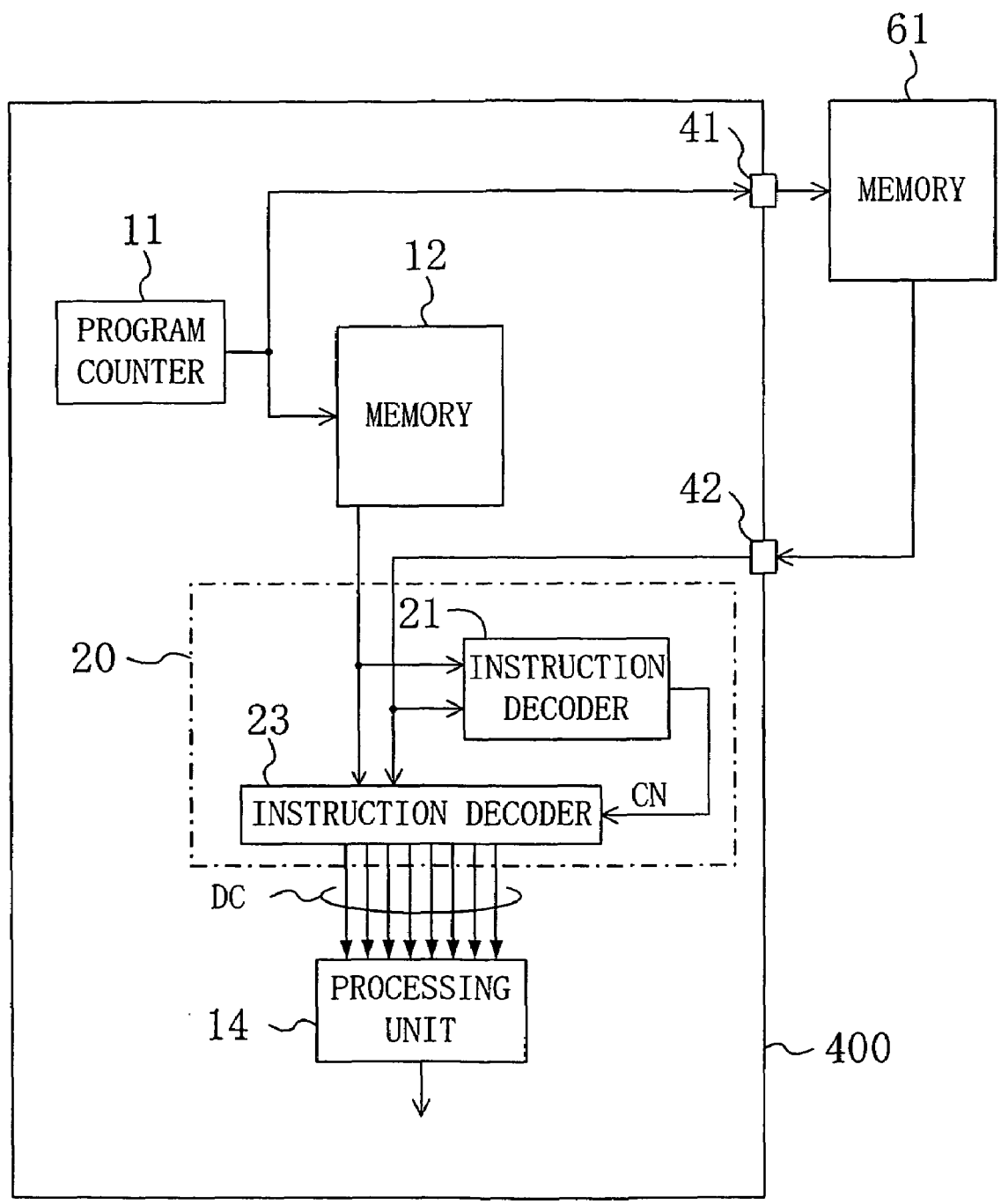
FIG. 8 is a block diagram of a third alteration to the information processing device of Embodiment 1 of the present invention.

FIG. 8 is a block diagram of an information processing device 400 of the third alteration to Embodiment 1. The information processing device 400 of FIG. 8 includes a first instruction decoder 23 in place of the instruction decoder 13 and further includes a second instruction decoder 21, in addition to the configuration of the information processing device 100 of FIG. 1. Instructions read from the memory 12 or 61 are sent to the instruction decoders 21 and 23. The instruction decoder 21 outputs the decoded result to the instruction decoder 23 as the control signal CN. The instruction decoders 21 and 23 constitute a decoding section 20.

FIG. 9 is a view showing instruction codes of instructions decoded by the decoding section 20 in FIG. 8 and examples of instruction names corresponding to the instruction codes. FIG. 9 is different from FIG. 3 only in that RCNFG instruction for changing (reconfiguring) the circuit configuration of the instruction decoder 23 is allocated in place of MUL instruction in FIG. 3.

Once the instruction decoder 21 decodes RCNFG instruction, it outputs first "1" and then "0" as the control signal CN. The instruction decoder 21 is not required to decode the instructions other than RCNFG instruction, and does not have a reconfigurable circuit.

The instruction decoder 23 has a reconfigurable circuit that can change the circuit configuration in response to the control signal CN. The instruction decoder 23 decodes input instructions in response to the control signal CN and outputs the recoded results to the processing unit 14. The instruction decoder 23 normally decodes the instructions based on the correspondence shown in FIG. 9, except for RCNFG instruction of which decoding is not required this time. Once the control signal CN changes from "0" to "1", the instruction decoder 23 changes its circuit configuration and performs decoding based on the correspondence shown in FIG. 4. When the control signal CN changes again from "0" to "1", the instruction decoder 23 changes its circuit configuration and performs decoding based on the correspondence shown in FIG. 9 again.

Hereinafter, the operation of the information processing device 400 in executing the processing shown in FIG. 5 will be described. Assume that RCNFG instruction is inserted in advance at the ends of the program for the processing A and the program for the processing B.

First, in the processing A, the instruction decoder 23 decodes input instruction codes based on the correspondence shown in FIG. 9. At this time, the instruction decoder 21 has given "0" as the control signal CN.

At the end of the processing A, the instruction decoder 21 decodes RCNFG instruction and thus outputs "1" to the instruction decoder 23 as the control signal CN. In response to the change of the control signal to "1", the instruction decoder 23 changes its circuit configuration. In the subsequent processing B, therefore, the instruction decoder 23 decodes input instruction codes based on the correspondence shown in FIG. 4. After decoding RCNFG instruction, the instruction decoder 21 returns the control signal CN to "0".

At the end of the processing B, the instruction decoder 21 decodes RCNFG instruction again, and thus outputs "1" as the control signal CN. In response to the change of the control signal to "1", the instruction decoder 23 changes its circuit configuration. In the subsequent processing C, therefore, the instruction decoder 23 decodes input instruction codes based on the correspondence shown in FIG. 9 again. After decoding RCNFG instruction, the instruction decoder 21 returns the control signal CN to "0".

As described above, in the information processing device 400 of FIG. 8, in which RCNFG instruction for changing the configuration of the instruction decoder 23 is described in advance in a program, the change of bits of instruction codes can be reduced during execution of a program, and thus the power consumption can be significantly reduced.

Fourth Alteration

Figure 10:
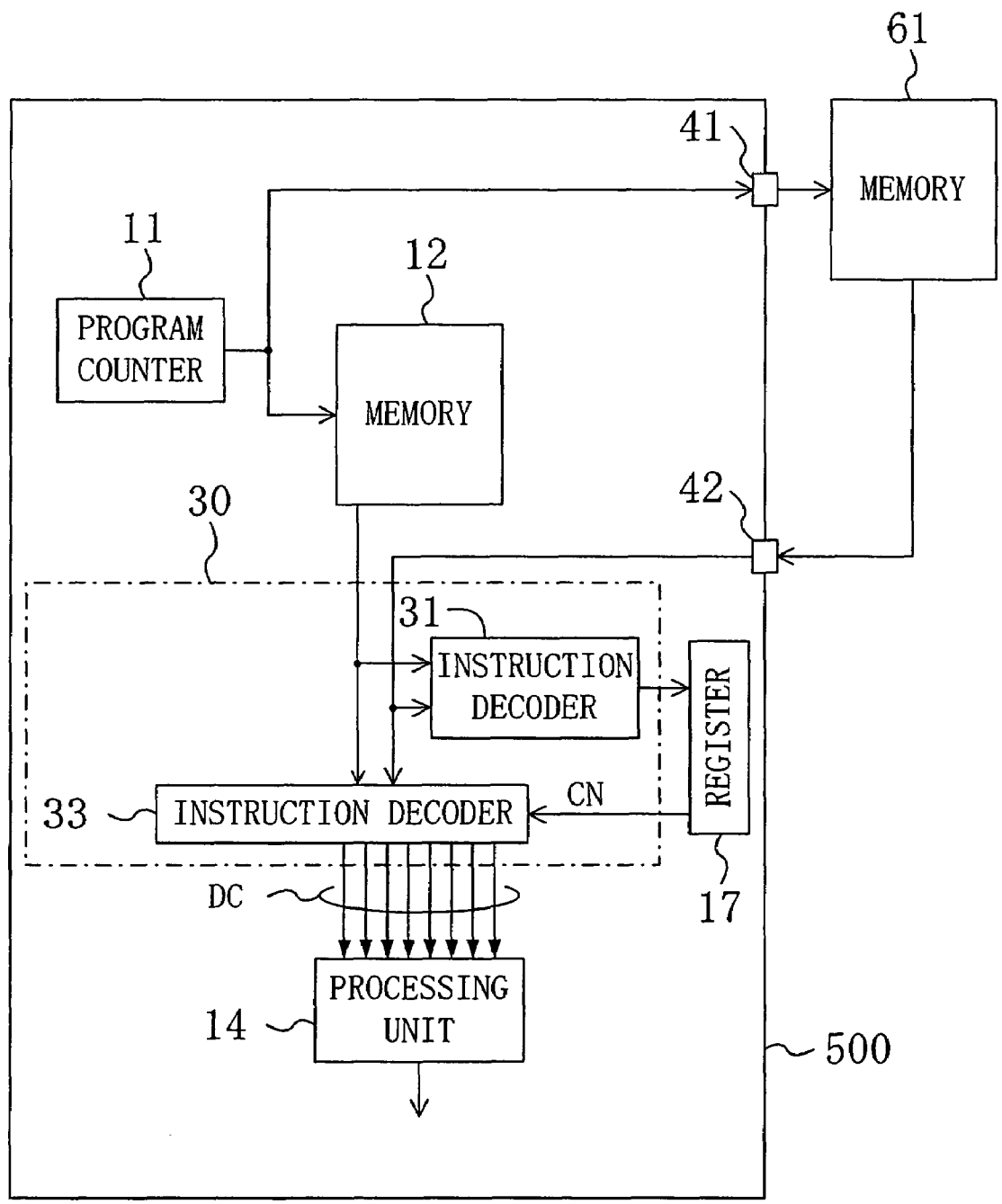
FIG. 10 is a block diagram of a fourth alteration to the information processing device of Embodiment 1 of the present invention.

FIG. 10 is a block diagram of an information processing device 500 of the fourth alteration to Embodiment 1. The information processing device 500 of FIG. 10 includes a first instruction decoder 33 in place of the instruction decoder 13 and further includes a second instruction decoder 31 and a register 17, in addition to the configuration of the information processing device 100 of FIG. 1. Instructions read from the memory 12 or 61 are sent to the instruction decoders 31 and 33. The instruction decoder 31 outputs the decoded result to the register 17, and the register 17 outputs the stored value to the instruction decoder 33 as the control signal CN. The instruction decoders 31 and 33 constitute a decoding section 30.

The decoding section 30 decodes input instructions based on the correspondence shown in FIG. 3, except that SETREG instruction is decoded in place of MUL instruction. SETREG instruction is an instruction for setting a value with the register 17.

Once the instruction decoder 31 decodes SETREG instruction having "1" designated as the operand, it outputs the value "1" to the register 17 to be stored therein. Likewise, once the instruction decoder 31 decodes SETREG instruction having "0" designated as the operand, it outputs the value "0" to the register 17 to be stored therein. The instruction decoder 31 is not required to decode the instructions other than SETREG instruction, and does not have a reconfigurable circuit.

The instruction decoder 33 has a reconfigurable circuit that can change the circuit configuration in response to the control signal CN. The instruction decoder 33 decodes input instructions in response to the control signal CN and outputs the recoded results to the processing unit 14. When the control signal CN is "0", the instruction decoder 33 performs decoding based on the correspondence shown in FIG. 3 (excluding MUL instruction). When the control signal CN is "1", the instruction decoder 33 changes its circuit configuration and performs decoding based on the correspondence shown in FIG. 4.

In the case that the information processing device 500 of FIG. 10 executes the processing shown in FIG. 5, SETREG instructions having "1" and "0" designated as the operand may be inserted in advance at the end of the program for the processing A and at the end of the program for the processing B, respectively.

As described above, in the information processing device 500 of FIG. 10, in which SETREG instruction for setting a value with the register 17 is described in advance in a program, the change of bits of instruction codes can be reduced during execution of a program, and thus the power consumption can be significantly reduced.

Embodiment 2

In the information processing device 400 of FIG. 8, to change the circuit configuration of the instruction decoder 23, it is necessary for the programmer to explicitly describe RCNFG instruction in a program described in an assembly language. In this embodiment, an information processing method for automatically inserting RCNFG instruction in a program will be described.

Figure 11:
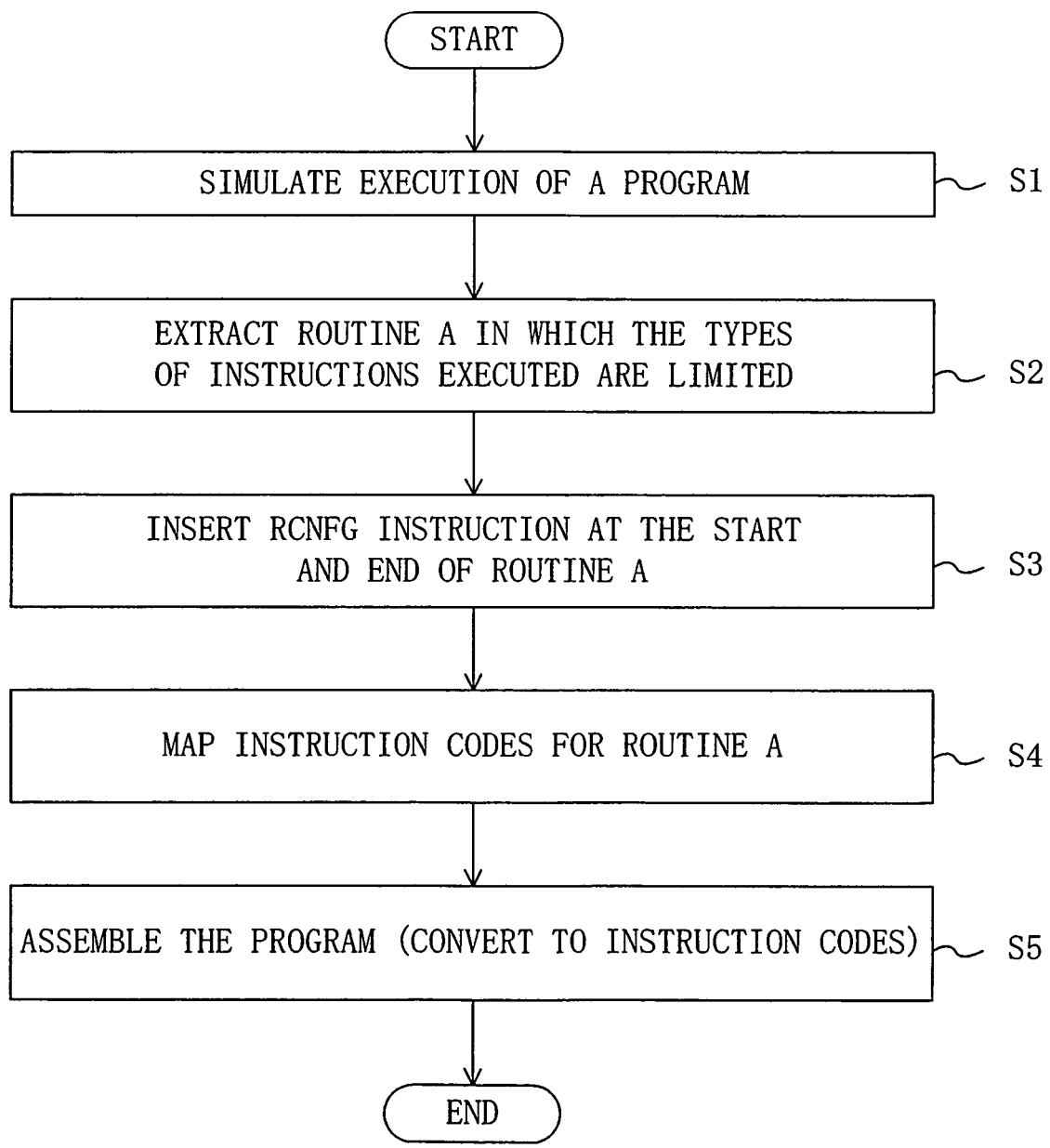
FIG. 11 is a flowchart showing the flow of processing in an information processing method of Embodiment 2 of the present invention.
Figure 13:
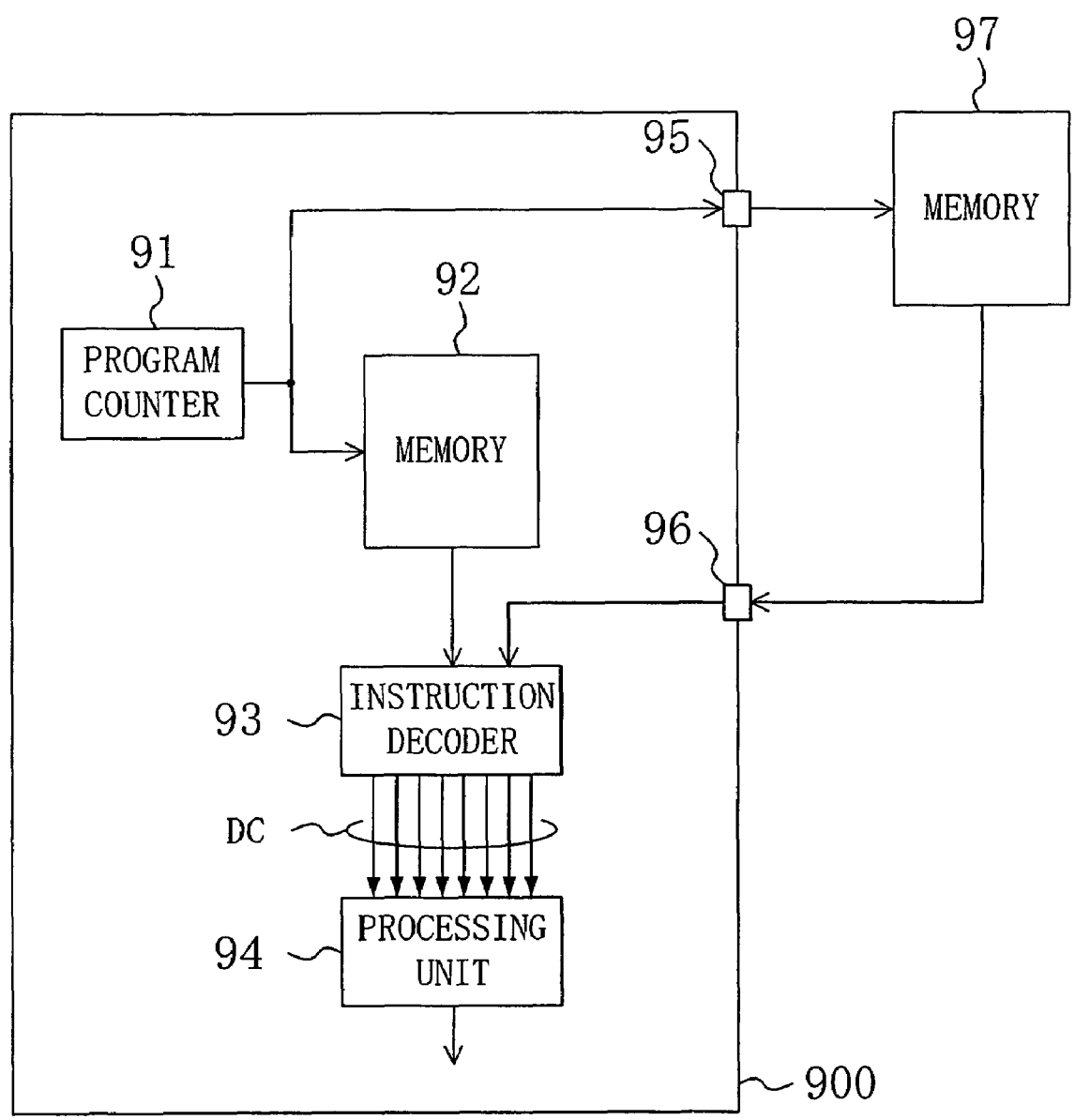
FIG. 13 is a block diagram showing a configuration of a portion of a conventional DSP related to decoding of instructions.

FIG. 11 is a flowchart showing the flow of processing of an information processing method of Embodiment 2 of the present invention. Herein, the method will be described as is implemented for the programs for executing the processing shown in FIG. 5 in the information processing device of FIG. 8.

In step S1, the programs for executing the processing A, the processing B and the processing C are input into a simulator and the like for simulating the operation of the information processing device 400 of FIG. 8, to simulate execution of the programs. During the simulation, the history of instructions executed is recorded.

In step S2, based on the recorded history, the types of instructions used and the order of execution of the instructions are analyzed, to obtain a portion (routine) of the programs in which the types of instruction codes used are limited to a predetermined number or less. For example, extracted in this step is a routine in which arithmetic operations such as ADD instruction and MAC instruction are used frequently and the types of instructions used are limited to four or less (hereinafter, such a routine is called routine A).

In step S3, RCNFG instruction for changing the circuit configuration of the reconfigurable circuit is inserted at the start and end of the routine A.

In step S4, instruction codes are allocated based on the types of instructions used in the routine A obtained in step S2 so that the bits of the instruction codes are less changed. In other words, the relationship between the instruction codes and the decoded results is established. For example, as shown in FIG. 4, it is set so that some bit of the instruction codes is a fixed value.

Alternatively, instruction codes may be allocated so that the bits of the instruction codes are less changed, based on the order of execution of the instructions in the routine A. For example, in the case that ADD instruction is executed subsequent to MAC instruction and MOV instruction is executed subsequent to ADD instruction with high frequency, instruction codes are allocated as shown in FIG. 4, for example, to reduce the difference in bit value between two instruction codes that are frequently used in sequence.

In step S5, the programs obtained in step S3 are converted to instruction codes and the like (assembled). At this time, the routine A sandwiched by RCNFG instructions is converted to instruction codes based on the allocation of the instruction codes obtained in step S4, that is, the correspondence shown in FIG. 4, for example. The other portions are converted to instruction codes based on the correspondence shown in FIG. 9.

As described above, in the information processing method shown in FIG. 11, RCNFG instruction is automatically inserted at the start and end of a routine in which the types of instructions used are limited. Accordingly, when the information processing device 400 of FIG. 8 executes the programs, the change of bits of the instruction codes can be reduced, and thus the power consumption can be significantly reduced.

Embodiment 3

FIG. 12 is a view showing instruction codes of instructions used in the program for executing the processing B and examples of instruction names corresponding to the instruction codes. As described in Embodiment 1, the bit length of the instruction field F1 shown in FIG. 2 is three bits, which is the number of bits required for identification of eight types of instruction codes shown in FIG. 3. In the processing B in FIG. 5, however, only the three types of instructions, MAC instruction, ADD instruction and MOV instruction, are used. In view of this, in this embodiment, the bit length of the instruction field F1 is shortened to two bits for the processing B, and the instruction decoder decodes the instructions based on the relationship shown in FIG. 12.

In this embodiment, since the bit length of an instruction is 15 bits, not 16 bits, the length of one word in the memories 12 and 61 for storing the program for the processing B can be 15 bits. The information processing device in this embodiment includes an instruction decoder for decoding instructions based on the relationship shown in FIG. 12 for the processing B, in place of the instruction decoder 13, in addition to the configuration of the information processing device 100 of FIG. 1. Hereinafter, the operation of this information processing device in executing the processing shown in FIG. 5 will be described.

During the time from T0 to T1, the information processing device executes the processing A in the manner described in Embodiment 1. In this execution, "0" is applied to the instruction decoder as the control signal CN. The instruction decoder decodes input instruction codes based on the correspondence shown in FIG. 3. The memory 12 or 61 outputs 16-bit instructions to the instruction decoder.

During the time from T1 to T2, in which the information processing device executes the processing B, the memory 12 or 61 outputs 15-bit instructions to the instruction decoder. Once "1" is applied to the instruction decoder as the control signal CN at time T1, the instruction decoder changes the circuit configuration and decodes input instruction codes based on the correspondence shown in FIG. 12.

During the time from T2 to T3, the information processing device executes the processing C in the manner described in Embodiment 1. In this execution, "0" is applied to the instruction decoder as the control signal CN. The instruction decoder changes the circuit configuration again and decodes input instruction codes based on the correspondence shown in FIG. 3. The memory 12 or 61 outputs 16-bit instructions to the instruction decoder.

As described above, instruction codes of instructions to be executed in each processing step are allocated so that the bit length is as short as possible. This reduces the capacity required for the memory storing the program. In particular, by storing the program for the processing B in a memory of a bank different from that for the programs for the processing A and the processing C, the area of the memory for storing the program for the processing B can be reduced, and also, the power consumption can be reduced.

In the embodiments described above, the relationship between the instruction codes used in the instruction field F1 shown in FIG. 2 and the decoded results was described. Likewise, the relationship between codes used in the other fields and their decoded results can also be changed.

For example, assume that there are four registers (registers r1, r2, r3 and r4) that can be designated by the codes used in the destination field F2 shown in FIG. 2, and that the register r2 is used subsequent to use of the register r0 in the processing B with high frequency. In this case, the codes are allocated for the registers r0 and r2 in the processing B so that the difference in bits between these codes is smaller than that in the other processing steps such as the processing A and the processing C. For example, the codes are allocated so that the difference in bits is one bit.

In the case described above, the circuit configuration of the reconfigurable circuit of the instruction decoder is changed to correspond to the allocation described above during execution of the processing B. This decreases the number of times of change of bits in the destination field F2 in the processing B, and thus can reduce the power consumption. This also applies to the readout fields F3 and F4.

The code allocation may also be made considering the change of bits in the entire instruction, not in each field. For example, assume that instruction "MAC r1, r3, r2" is executed subsequent to execution of instruction "ADD r0, r1, r2" in the processing B with high frequency. In this case, in the processing B, the instruction codes and the codes for the registers r0 to r3 are allocated so that the difference in bits between the 16-bit codes of these instructions is smaller than that in the other processing steps such as the processing A and the processing C.

Note that it is possible to set the number of instructions processed by the information processing device, the instruction bit length, the format of each field such as the instruction field, the length of each field such as the instruction field, the types of instructions, the instruction codes and the like differently from those described in the above embodiments.

The information processing device may include only the memory 12 in which programs are stored. Otherwise, the information processing device may not include the memory 12 but only be connected to the memory 61 in which programs are stored.

The invention claimed is:

1. An information processing method for coding a program to enable an information processing device to execute the program, the information processing device being provided with an instruction decoder having a reconfigurable circuit, the method comprising the steps of:
   simulating execution of the program to obtain a history of instructions executed;
   extracting a routine in which a number of types of codes used in at least a field among fields constituting an instruction is limited to a predetermined number or less, from the program based on the history;
   inserting an instruction for changing circuit configuration of the reconfigurable circuit at the start and end of the routine;
   allocating codes so that the number of times of change of bit values in a field in which the number of types of codes used are limited is reduced for the routine; and
   converting a program obtained in the step of inserting an instruction to codes according to the allocation for the routine.

2. The information processing method of claim 1, wherein in the step of allocating codes, codes are allocated based on the order of execution of instructions in the routine.

3. An information processing device comprising memory means for storing codes obtained by the information processing method of claim 1.

* * * * *